United States Patent Office 3,256,986
Patented June 21, 1966

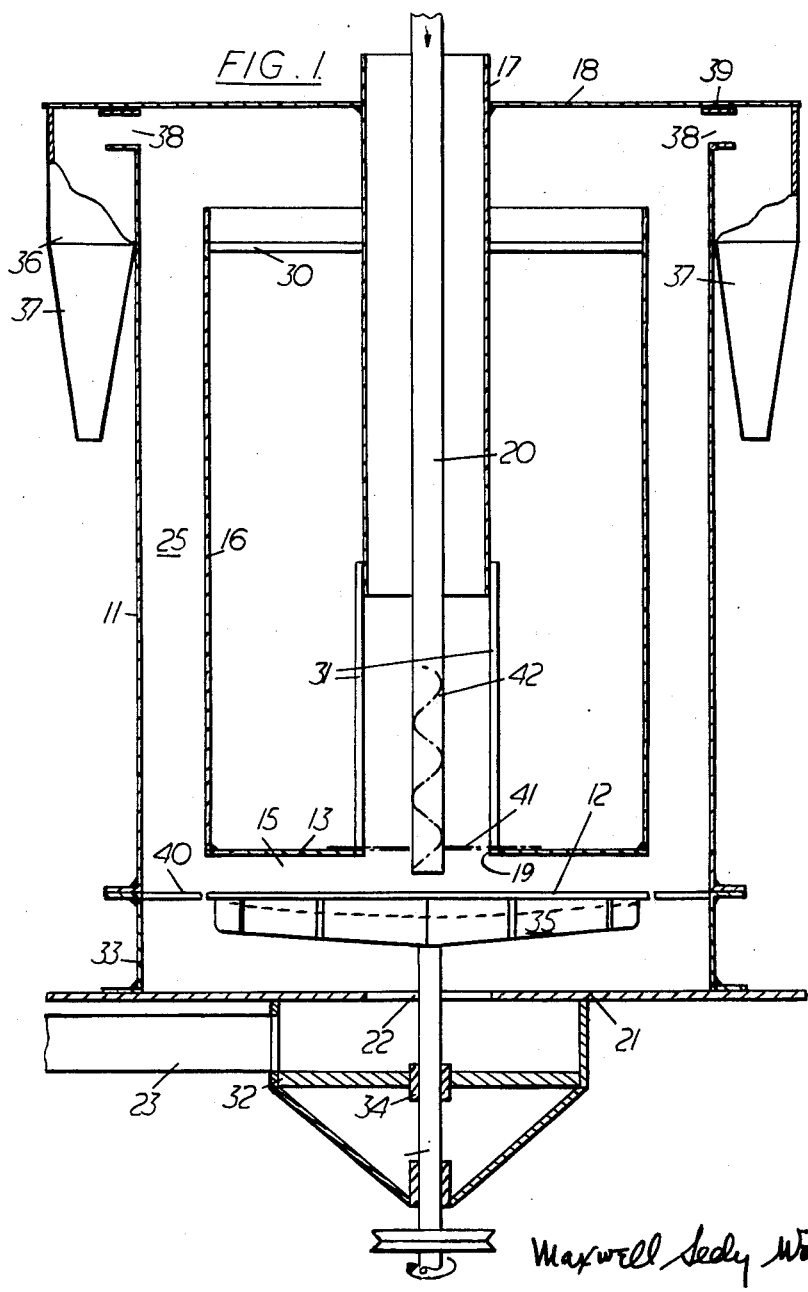

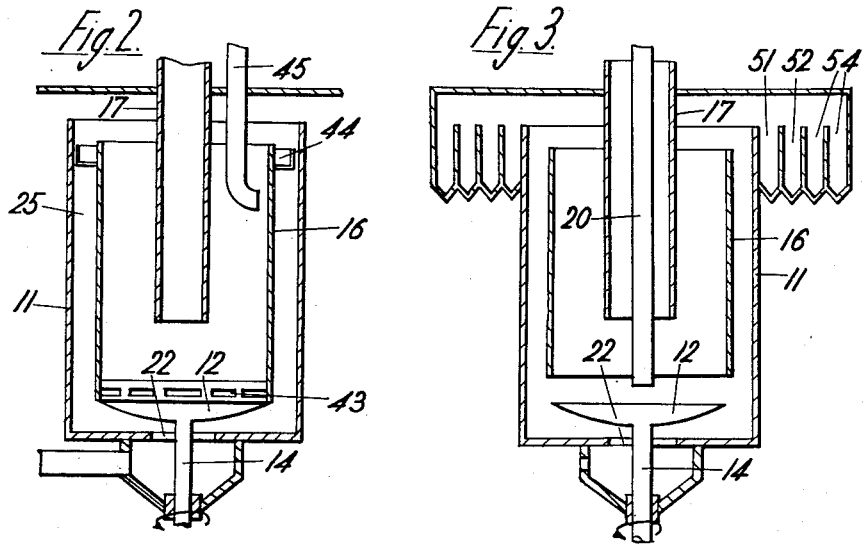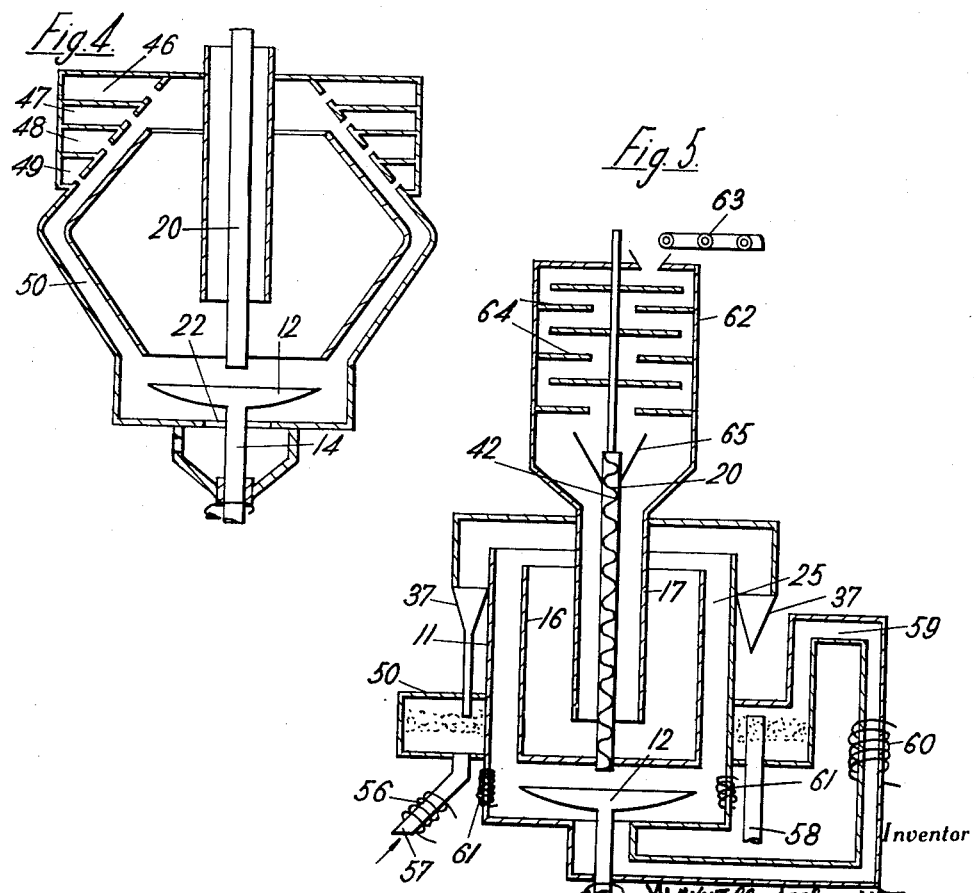

3,256,986
APPARATUS FOR CENTRIFUGAL SEPARATION OF FLUIDIZED SOLIDS
Maxwell Seely Woosnam, Flat 9, 35 Elm Park Gardens, London SW. 10, England
Filed July 6, 1961, Ser. No. 138,539
Claims priority, application Great Britain, Oct. 28, 1960, 37,223/60
13 Claims. (Cl. 209—144)

This invention relates to the contacting of fluids and solids. It is an object of the invention to provide apparatus whereby fluids and solids can be continuously contacted with one another in an evenly distributed state and which makes for rapid mixing and separation of the two streams to be contacted.

According to the present invention, apparatus for the contacting of fluids and/or solids comprises at least one rotary plate or plate assembly on different surfaces of which two streams of fluid and/or solids are accelerated and discharged under centrifugal action at the periphery of the plate into intimate contact with one another. While opposite sides of the same plate are preferably employed, it will be clear that two plates can be used, one for each of the streams, as long as the plate surfaces concerned are mutually arranged so that the two streams enter into intimate contact with one another as they leave the plate surfaces.

In the preferred arrangement, one stream is solids in the form of powder which is fed down on to the upper surface of a horizontal spinning impeller plate, while the other stream is gaseous and is directed on to the underside of the plate, the gas flow rising around the plate periphery and carrying with it into a fluidising section of the apparatus the powder leaving the upper plate surface at said periphery.

The gas and solids may subsequently separate by cyclone action due to the rotation imparted to the contacted streams by the spinning plate either alone or augmented by the rotation of other parts of the apparatus.

Various arrangements in accordance with the invention will now be described by way of example, reference being had to the accompanying diagrammatic drawings in which:

FIGURE 1 is a vertical cross-section through an apparatus embodying the invention, FIGURE 2 is a diagram of a modified form of the apparatus, FIGURES 3 and 4 are diagrams illustrating further possible modifications, and FIGURE 5 shows a modified arrangement in which heat is applied to the process occurring in the apparatus.

In FIGURE 1 there is shown a reactor intended particularly for the drying and/or decomposition of chemicals. It has a cylindrical vertical casing 11 at the bottom of which there rotates at high speed a horizontal dished centrifugal plate 12 of smaller diameter than the casing and with impeller blades 35 on its underside which plate is driven from below by a variable speed motor (not shown) through a shaft 14. Extending up through the casing 11 above the impeller plate 12, and spaced therefrom by a gap 15, is a cylinder 16 of substantially the same diameter as the plate 12. The casing 11 is closed by a plate 18 at its upper end, except for the entry of a central open-ended trunk 17, and the cylinder 16 stops short of this closed end. The lower end of the cylinder 16 has a bottom plate 13 with a central aperture 19. The trunk 17, which constitutes an uptake exit for exhaust air or gas, extends down some distance into the cylinder 16, being connected thereto by a spider 30 and legs 31 upstanding from the plate 13, and powdered material to be dried or decomposed enters the reactor through a pipe 20 of smaller diameter than, and disposed coaxially within, the gas trunk 17. From the pipe 20 the powder feeds down through the aperture 19 in the plate 13 on to the centre of the upper surface of the impeller plate 12.

The casing 11 has a downward extension ring 33 provided with a floor plate 21, with the drive shaft 14 extending up through an aperture 22 in this plate. Below the floor plate 21 is an air box 32 having an air or gas inlet 23 and fitted with a gas-tight bearing 34 for the shaft 14. An annular trunk 36 around the top of the casing 11 provides a collector for powder from which there lead off downwardly two outlet nozzles 37 disposed at diametrically opposite positions. The collector trunk 36 is entered from within the casing 11 through an annular gap 38 which is bridged only at four places spaced at 90° intervals around the casing to connect to the main body of the casing a top flange 39 carrying the plate 18.

As the powder feeds on to the centre of the impeller plate 12 in controlled amount it is flung outwardly over the plate periphery. Here it enters a rising stream of air or other gas, the gas being admitted at the inlet 23 and passing up through the central aperture 22 of the floor plate 21 to the blades 35 of the impeller plate 12 which drive it outward until it can escape up round the impeller plate periphery. The gas carries the powder upwardly into a fluidising section of the apparatus, constituted by the annular space 25 between the casing 11 and the cylinder 16, and the drying or other desired process takes place. The powder can be held in a fluidised state in the annular space 25 at various levels according to the tangential and upward velocities.

The spinning plate 12 imparts a swirling motion to the contacted gas/solids stream and consequently the powder will tend to separate out from the gas by cyclone action. Most of the powder will pass out through the annular exit 38. The remainder of the gas/solids stream passes over into the cylinder 16 where the rest of the powder separates out and falls down to be recycled. The gas leaves through the trunk 17.

The impeller plate rotates at high speed and may impart too much swirling motion to the stream in the fluidising section 25. This can be overcome by placing stator vanes 40 between the periphery of the impeller plate 12 and the casing 11 to convert centrifugal motion into vertical motion. If the incoming powder material is likely to contain lumps or pack together, for example if it is wet, it may be necessary to provide a positive feed by means of a screw conveyor in the pipe 20 as indicated at 42. At the upper end of the pipe there can be a cylindrical feed bin with a rotating arm near the bottom of it to ensure a continuous supply of powder to the screw. If recirculation of powder is not desired, the aperture 19 in the plate 13 can be blanked off by a disc 41 having a hole to pass the pipe 20.

If desired, the cylinder 16 can be arranged to rotate with the impeller plate. A construction in which this occurs is shown in FIGURE 2. The lower end of the cylinder 16 joins the periphery of the impeller plate 12, and the powder passes out through perforations 43 in the cylinder. In this case, instead of the powder being delivered to the centre of the impeller plate it can be directed by a stationary feed pipe 45 against the inner wall surface of the rotating cylinder 16. Also, it is possible to provide axial flow impeller blades on the exterior of the cylinder 16, for example at the top of the fluidising section 25 as shown at 44.

It is possible by a suitable arrangement to obtain classification of the product. FIGURES 3 and 4 illustrate two ways of doing this. In FIGURE 3 a number of collection trunks 51, 52, 53, 54 are arranged at the top of the fluidising section one outside another. In FIGURE 4, collection trunks 46, 47, 48, 49 are disposed one above another and intersect the upper part of an annular fluidising section 50 of which the walls are not vertical but which reduces progressively in diameter in both upward and downward directions from an intermediate height at which the maximum diameter occurs.

If the process requires heat, burners or other heaters can be provided around the casing 11 in the region of the impeller plate. In this connection, FIGURE 5 shows an arrangement in which heat is applied to the process and heat recovery is practised. Around the casing 11 of the apparatus there is disposed an annular fluidised bed 55 of conventional form; the powder collected from the annular fluidising section of the main apparatus at the outlets 37 is fed downwardly to this bed 55 while incoming air (or gas) is delivered upwardly to the bed 55 from below. Heat can be applied to the incoming air by a heater coil 56 surrounding the air inlet pipe 57. The final powder product is removed from the chamber containing the bed 55 by a downtake 58 while the air is led off upwardly through a pipe 59 which then delivers it to the bottom of the main apparatus below the impeller 12. Further heat can be supplied to the air at this stage by a heating coil 60 surrounding the pipe 59. There are also heaters 61 provided around the casing 11 in the region of the impeller periphery.

The powder is delivered into the main apparatus through a conventional kiln type preheater or predrier 62. Powder fed in at the top of the preheater 62 by a conveyor 63 descends from level to level on a series of trays 64 while being dried by the exhaust air from the main apparatus, the lower end of the casing of the preheater 62 being connected to the upper end of the air outlet trunk 17. At the bottom of the preheater 62 the powder falls from the lowermost tray into a hopper 65 supplying a screw conveyor 42 in the powder feed pipe 20. The exhaust air entering the preheater 62 from the trunk 17 passes out of the preheater through the powder feed inlet at the top of the preheater. In this way, heat supplied to the incoming air is recovered to a large extent in the powder preheater.

The fluidising section or a portion thereof can, if desired, be subjected to an electrical field, or to ionising radiation or the like, for example irradiation by a radioactive source.

As a further modification, it is possible to vary the velocities in the fluidising section, either by a change in configuration of the fluidising space that produces a change in flow area or by a change in the quantity of flow. The later can be accomplished by furnishing apertures for flow through the inner cylinder 16. There may, if desired, be powder outlets at varying heights which can be opened or closed at will.

An apparatus as described can be twinned with a similar apparatus, one constituting a reactor and the other a regenerator. That is to say reagent powder leaving the reactor after being employed to treat the gas stream therein can be regenerated for further use in the reactor by being contacted with a different gas stream to react therewith in the regenerator. For this purpose, the powder exit of each apparatus is connected to the powder inlet pipe of the other.

Although the basic apparatus unit described and illustrated has one vertical annular fluidising space 25, there can be more than one such space, for example two or more arranged coaxially. It is possible by modifications of this kind to achieve internal circulation within the fluidising section of the apparatus. Also a coaxial arrangement of reactor and regenerator is possible.

As already mentioned the spinning plate in FIGURE 1 is dished and this is the preferred configuration. It may be roughened, ribbed or otherwise provided with an irregular upper surface in order to improve acceleration of the powder in it; or there may be impeller vanes on the upper side of the plate to throw the powder away from the centre and ensure there is no back pressure on the powder feed.

I claim:
1. Apparatus for the contacting of fluids and particulate solids comprising, an outer casing of circular cross-section, an inner casing of circular cross-section supported within the outer casing, said inner and outer casings being substantially concentric with respect to a common vertical axis and having spaced peripheral walls defining therebetween a fluidisation chamber which extends both annularly about said axis and upwardly substantially parallel thereto, there being communication between said fluidisation chamber and the interior of said inner casing at the tops thereof for the passage of material inward from the fluidisation chamber to the inner casing interior, said outer casing extending downwardly somewhat below the bottom end of said inner casing, an impeller plate mounted for rotation about said axis and disposed directly under said inner casing with its upper plate surface in position to receive thereon material descending through said inner casing, drive means to rotate said impeller plate rapidly, said impeller plate having a diameter substantially equal to the diameter of the bottom end of said inner casing and defining therewith at least one aperture through which material on the upper surface of said plate is discharged by centrifugal action into the lower end of the fluidisation chamber, feed means for introducing fresh material mounted within said inner casing and extending down therethrough to discharge material onto the center area of the upper surface of said impeller plate, entry means at the bottom of said outer casing to discharge fluid against the underside of said impeller plate whereby material discharged by said impeller plate into the lower end of the fluidisation chamber is carried up into a state of fluidisation by fluid flowing across the underside of said plate and up past the plate periphery, collector means on said outer casing for collecting material from the fluidisation chamber, and an outlet trunk for fluid extending upwardly from within said inner casing.

2. Apparatus as claimed in claim 1, wherein the underside of said plate is provided with radial flow impeller blading.

3. Apparatus as claimed in claim 1, wherein said outlet trunk extends concentrically within the inner casing and has an entry opening at a position intermediate the inner casing ends, whereby downward gas flow occurs around said trunk in an upper part of said inner casing.

4. Apparatus as claimed in claim 3, wherein said feed means comprises a powder feed pipe extending concentrically through the outlet trunk.

5. Apparatus as claimed in claim 4, wherein a screw conveyor is provided within the feed pipe.

6. Apparatus as claimed in claim 1, wherein the inner casing rotates with the impeller plate.

7. Apparatus as claimed in claim 6, wherein axial flow impeller blading is provided on the exterior of the inner casing in the fluidisation chamber.

8. Apparatus as claimed in claim 1, wherein fixed blading is provided around the periphery of the impeller plate through which the fluid flow passes on its way into the fluidisation chamber.

9. Apparatus as claimed in claim 1, wherein said collector means comprise one or more substantially annular outward flow outlets provided near the top of the fluidisation chamber.

10. Apparatus as claimed in claim 1, wherein said collector means comprise a number of different powder take-off trunks with entries at different distance from the axis of rotation of the impeller plate, to obtain classification of the product.

11. Apparatus as claimed in claim 1, and comprising heating means to apply heat in the region of the impeller plate periphery.

12. Apparatus as claimed in claim 1, and comprising a preheater through which incoming material feed is passed where it is heated by outlet fluid.

13. Apparatus as claimed in claim 1, wherein the outer casing is surrounded by a further fluidisation chamber, the material collected from the inner fluidisation chamber forming the feed for said further chamber, and the outlet fluid from said further chamber forming the fluid supply to said inner chamber.

References Cited by the Examiner

UNITED STATES PATENTS

| | | | |
|---|---|---|---|
| 452,581 | 5/1891 | Morse | 229—148 X |
| 1,144,640 | 6/1915 | Coleman | 34—59 |
| 1,461,777 | 7/1923 | Koch | 209—145 |
| 2,357,901 | 9/1944 | Lewis | 34—57 |
| 2,607,484 | 8/1952 | Whitfield | 209—148 |

FRANK W. LUTTER, *Primary Examiner.*

HARRY B. THORNTON, RICHARD A. O'LEARY,
*Examiners.*